United States Patent [19]
Hudspeth et al.

[11] 3,729,213
[45] Apr. 24, 1973

[54] HYDRAULIC DRIVE FOR A BICYCLE

[76] Inventors: Steve A. Hudspeth, 906 6th Street; John B. Lunsford, 1061 "B" Street, both of Springfield, Oreg.

[22] Filed: June 11, 1971

[21] Appl. No.: 152,209

[52] U.S. Cl. ............... 280/216, 280/226, 280/234, 280/276
[51] Int. Cl. .................. B62m 1/10, B62m 1/20
[58] Field of Search .............. 280/212, 214, 215, 280/216, 226, 234, 276

[56] References Cited

UNITED STATES PATENTS

| | | | |
|---|---|---|---|
| 576,538 | 2/1897 | Bellamy | 280/216 |
| 2,049,010 | 7/1936 | Horton | 180/54 R |
| 498,888 | 6/1893 | Rockwell | 280/216 |
| 610,956 | 9/1898 | Ubil | 280/216 |
| 614,992 | 11/1898 | Schmidt | 280/216 |
| 735,628 | 8/1903 | Waxel | 280/216 |
| 2,144,538 | 1/1939 | Kaskell | 280/216 |
| 2,160,034 | 5/1939 | Schwinn | 280/276 |

*Primary Examiner*—Kenneth H. Betts
*Assistant Examiner*—Leslie J. Paperner
*Attorney*—James D. Givnan et al.

[57] ABSTRACT

A bicycle having a fluid powered motor. A primary source of fluid for motor operation provided by a pair of hydraulic cylinders with pistons therein powered by the feet of the rider. A secondary or auxiliary source of fluid under pressure for motor operation residing in a pair of seat actuated fluid pumps. The bicycle seat is mounted to permit the weight of the rider to be yieldably supported with fluid being exhausted from said pumps upon bicycle seat movement while the rider is negotiating irregular ground surfaces. An additional source of fluid pressure may be provided by still another cylinder operatively coupled to the front fork of the bicycle.

2 Claims, 5 Drawing Figures

Patented April 24, 1973　　　3,729,213
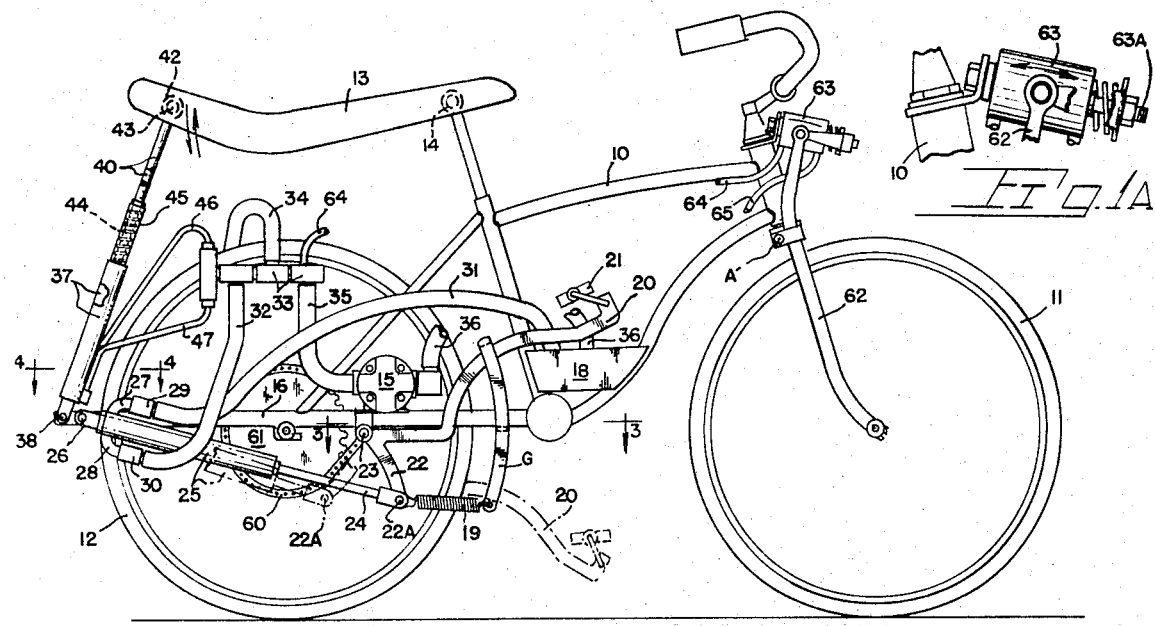
Fig. 1
Fig. 1A
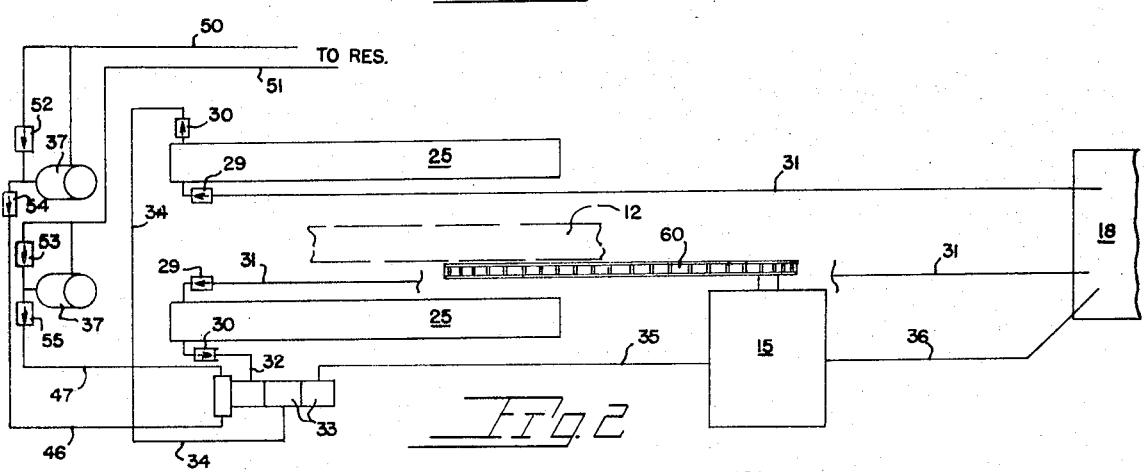
Fig. 2
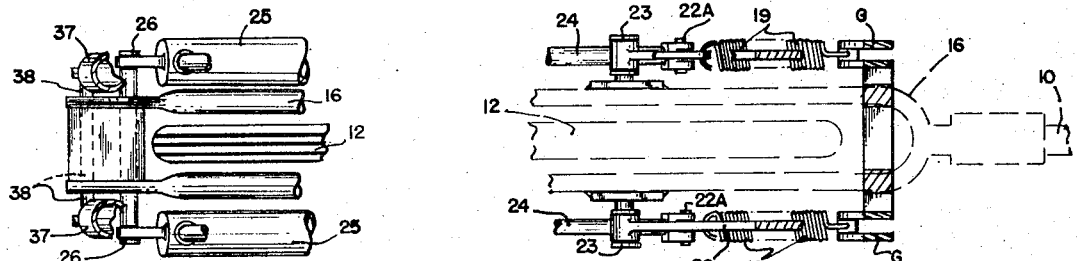
Fig. 4
Fig. 3
STEVE A. HUDSPETH
JOHN B. LUNSFORD
INVENTORS
BY
AGENT

HYDRAULIC DRIVE FOR A BICYCLE

BACKGROUND OF THE INVENTION

The present invention relates generally to a hydraulic drive for a bicycle wherein the fluid is pressurized by both physical effort exerted by the rider and the weight of the rider actuating hydraulic means during travel.

To the extent the prior art is known, bicycles typically include power transmission means embodied in the well known sprocket and roller chain components. Recent advances in the art have brought about multi-speed drive ratios wherein the rider may select the ratio best suiting the course being travelled. While these last mentioned improvements provide for efficient power transmission the rider's pedaling effort constitutes the only source of power. The present hydraulic drive enables an auxiliary source of the power to be added to such pedaling effort.

SUMMARY OF THE INVENTION

The present invention is embodied in a hydraulic drive for a bicycle having a pair of hydraulic cylinders constituting pumps for actuation by the rider's feet. Foot operated pedals are linked to the pistons of said cylinders for pressurizing a fluid flow for ultimately powering the rear wheel of the bicycle. A hydraulic motor, powered by the fluid flow, is in driving engagement with said rear wheel.

An auxiliary flow of hydraulic fluid, supplementing the fluid from the foot powered cylinders, results from the vertical motion of the rider weighted bicycle seat during travel. Accordingly, the hydraulic flow from the foot powered cylinders is intermittently supplemented by a fluid flow resulting from varying loads imparted to the bicycle seat while underway. The pistons of said seat actuated cylinders retract upon the bicycle encountering an uneven ground surface to discharge the auxiliary hydraulic flow with subsequent elevation of the seat being spring actuated.

Additional auxiliary pump means may be located so as to derive a powering force during relative movement between the front fork of the bicycle and the bicycle frame.

BRIEF DESCRIPTION OF THE DRAWING

In the accompanying drawing,

FIG. 1 is a side elevational view of a bicycle equipped with the present hydraulic drive with the unseen side being substantially identical, FIG. 1A is an enlarged detail view of fluid pump means associated with the front fork of the bicycle, FIG. 2 is a schematic of the hydraulic system, FIG. 3 is a view taken downwardly along line 3—3 showing details of the pedal arm structure, and FIG. 4 is a view taken downwardly along line 4—4 of FIG. 1 showing details of mounting means for the auxiliary and foot powered cylinders.

DESCRIPTION OF PREFERRED EMBODIMENTS

With continuing reference to the drawings wherein applied reference numerals identify parts similarly identified in the following specification, the reference numeral 10 indicates a bicycle frame of substantially conventional construction.

The frame 10, supported by front and rear wheels 11 and 12, supports an elongate seat 13 for the rider or riders, the latter being pivotally mounted at 14 at its forward end for purposes later elaborated upon. A hydraulic motor at 15 is frame mounted to a modified rear fork structure at 16 which serves as a mounting base for additional hydraulic components as later described. The rear fork 16, in distinction to a conventional bicycle frame, is lengthened and terminates rearwardly past the rear tire 12 whereat a spacer block 17 serves to rigidly interconnect the fork ends. The hydraulic motor 15 is suitably secured to the seen side of the rear fork structure 16 as viewed in FIG. 1 alongside the rear wheel. A fluid reservoir 18 is carried by frame 10 with return and discharge conduits terminating therein as later described.

Swingably suspended from the rear fork structure 16 are pedal arm structures 20 for foot actuation. A typical arm structure 20, as seen in FIG. 1, locates a pedal 21 forwardly to conveniently receive a rider's foot. A throw portion 22 of the arm moves about an arm pivot 23 carried by the frame, with the throw end being in pivoted attachment at 22A at its outer end with the end of a piston rod 24. Helical springs at 19 serve to return the pedal arm structures 20 to their raised position. Pedal guides are provided at G and also carry springs 19.

A pair of foot actuated cylinders at 25 are swingably mounted at their base ends as at 26 to fork 16 of frame 10 to permit arcuate cylinder movement during retraction and extension of their respective piston rods. At the base end of each cylinder are inlet and exhaust fittings 27–28 typically shown in FIG. 1 in communication with the bore of the cylinder and also check valves 29 and 30. A fluid supply is provided the cylinders by conduits 31 drawing from reservoir 18. As best seen in FIG. 2 fluid exhausted sequentially from cylinders 25 passes via conduits 32 and 34 to a series of stacked T-fittings at 33 with pressurized hydraulic fluid ultimately entering motor 15 via a conduit 35.

With continuing regard to the motor, the same may be of the sliding vane type with exhausted fluid from the motor returning to the reservoir via a conduit 36. The use of other types of hydraulic motors, as for example, the piston type, is within the scope of the present invention.

A pair of seat powered cylinders are indicated at 37 pivotally mounted in an upright manner at the rearward end of fork 16. With reference to FIG. 4, the base ends of the cylinders are movably mounted on a shaft 38 or otherwise suitably mounted to permit cylinder movement during operable movement of their piston rods indicated at 40. Each of the piston rods 40 terminates upwardly in pivoted attachment at 42 about a crosswise extending seat member 43. Accordingly, as the bicycle is ridden with the rider's weight bearing on seat 13, movement of the seat will occur about the seat pivot means 14 as uneven loads are imparted to the seat as by travel over irregular ground surfaces. Also acting on the piston rods 40 but in an upward direction are a pair of spring members indicated at 44 each within a housing 45. For exhausting a pressurized fluid flow from the lower ends of cylinders 37 a pair of conduits 46–47 are provided terminating in communication with the series of stacked T-fittings 33. For supplying both ends of the cylinders 37 with hydraulic fluid branched hydraulic lines 50-51 draw from reservoir 18. Check valves 52-53 and 54-55 ensure the desired flow of the exhausted fluid.

From the foregoing description it will be seen that the fluid flow the rider's physical effort exerted on the earlier described pedal arm structures 20 will be supplemented by an auxiliary fluid flow exhausted from cylinders 37. Operation of the bicycle solely with the rider's effort is entirely satisfactory with the auxiliary fluid flow permitting a reduction in the pedalling effort.

The bicycle is, as aforementioned, largely of conventional design and preferably incorporates a conventional rear hub of the well known "3 speed" type. Such hubs permit the rider to select the most suitable gear ratio by means of a handle bar mounted selector not shown. Further explanation of the hub is believed unnecessary as such are well known to those skilled in the art.

The motor 15 with sprocket drives a roller chain 60 (FIG. 2) in driving engagement with a hub mounted sprocket 61. The latter sprocket may be of conventional 48 tooth size while the driving sprocket on the motor output shaft may be a 9 tooth sprocket.

A modified form of the invention encompasses the addition of a second auxiliary source of hydraulic pressure such being by movement of the front wheel fork of the bicycle relative to the bicycle frame. In this modified form of the invention the bicycle is of the type having a yieldable front fork 62 attached to a steerable member in a manner permitting movement of the fork about a normally horizontal, transverse axis indicated at A. Such structure has been embodied in bicycles manufactured in the past by the Schwinn Bicycle Company and was originally manufactured for use in combination with a compression spring element biasing the front wheel to a lowermost position. In the present modification the compression spring element is dispensed with and a hydraulic pressure source at 63 is substituted in its place. A pair of hydraulic lines 64-65 serve the ends of said source of hydraulic pressure with one of said lines drawing from reservoir 18 while the second line exhausts into the stacked T-fittings 33. The pressure source 63 may be embodied in a double acting hydraulic cylinder with internal check valves permitting both charging and simultaneous exhausting of hydraulic fluid on opposite sides of a piston during either direction of movement of a piston rod 63A. A U-shaped bracket couples the upper end of the fork to the piston rod.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

1. A hydraulic drive for a bicycle, said drive comprising,
   a hydraulic motor,
   a source of hydraulic fluid,
   a power transmission means coupling said motor to the rear wheel of the bicycle,
   hydraulic cylinders with reciprocating pistons constituting hydraulic pumps,
   pedal arm structures swingably mounted on the frame of the bicycle for actuation by the rider's feet and including a throw portion for reciprocal movement within an arc, said arm structures coupled to the pistons of said hydraulic cylinders for operation of same to pressurize fluid therein,
   said hydraulic cylinders being swingably mounted at their base to the bicycle frame and including piston rods terminating at their outer ends in pivoted attachment to said throw portions of the pedal structures whereby foot actuated movement of the throws will exhaust hydraulic fluid under pressure in a sequential manner from said cylinders, and
   hydraulic circuitry communicating said hydraulic cylinders with said motor for delivery of a pressurized flow to the motor.

2. The hydraulic drive as claimed in claim 1 additionally including a secondary source for pressurizing hydraulic fluid comprising a pair of upright cylinders pivotally attached at their base ends to the bicycle frame, piston rods extending upwardly from said cylinders for pivoted attachment to the seat component of the bicycle for exhausting fluid from said upright cylinders upon closing movement between said seat and the bicycle frame, means biasing said piston rods and the seat in an opposite direction to a raised position.

* * * * *